United States Patent
Martin et al.

(10) Patent No.: US 7,565,662 B2
(45) Date of Patent: Jul. 21, 2009

(54) PROGRAM AGENT INITIATED PROCESSING OF ENQUEUED EVENT ACTIONS

(75) Inventors: Sean J. Martin, Boston, MA (US); Dan Smith, Stevens Point, WI (US); Benjamin H. Szekely, Boston, MA (US)

(73) Assignee: International Business Machines Corporation, Armonk, NY (US)

(*) Notice: Subject to any disclaimer, the term of this patent is extended or adjusted under 35 U.S.C. 154(b) by 1089 days.

(21) Appl. No.: 10/949,839

(22) Filed: Sep. 24, 2004

(65) Prior Publication Data

US 2006/0090165 A1  Apr. 27, 2006

(51) Int. Cl.
G06F 3/00 (2006.01)
G06F 9/44 (2006.01)
G06F 9/46 (2006.01)
G06F 13/00 (2006.01)

(52) U.S. Cl. .................................. 719/318; 709/203
(58) Field of Classification Search ................ 719/318; 718/105; 709/203
See application file for complete search history.

(56) References Cited

U.S. PATENT DOCUMENTS

| | | | |
|---|---|---|---|
| 5,469,562 A | 11/1995 | Saether | 395/182.18 |
| 5,481,699 A | 1/1996 | Saether | 385/182.13 |
| 6,192,354 B1 | 2/2001 | Bigus et al. | 704/46 |
| 6,393,458 B1 | 5/2002 | Gigliotti et al. | 709/203 |
| 6,418,458 B1* | 7/2002 | Maresco | 718/103 |
| 6,557,025 B1 | 4/2003 | Hattori et al. | 209/202 |
| 2001/0029548 A1* | 10/2001 | Srikantan et al. | 709/250 |
| 2002/0165872 A1 | 11/2002 | Meltzer et al. | 707/500 |
| 2003/0093499 A1* | 5/2003 | Messinger et al. | 709/219 |
| 2003/0167352 A1* | 9/2003 | Hoshiai et al. | 709/318 |
| 2004/0024897 A1 | 2/2004 | Ladd et al. | 709/231 |
| 2004/0139434 A1* | 7/2004 | Blythe et al. | 718/100 |

FOREIGN PATENT DOCUMENTS

JP  2000-250797  9/2000
WO  WO 02/13018 A2  2/2002

* cited by examiner

*Primary Examiner*—Meng-Ai An
*Assistant Examiner*—Diem K Cao
(74) *Attorney, Agent, or Firm*—John E. Campbell

(57) ABSTRACT

An Event Manager receives events requiring action. The events are parsed into event action types which are placed in an Event Queue. Program agents in a pool of agents are dynamically instantiated and retired from the pool based on the number of queued events by type. Program agents, when available, initiate a search for a work entry on the Event Queue that is of a type that the agent can handle. When an agent finds work, the corresponding Event Queue entry is marked as assigned to the agent and the agent performs the action associated with the work entry.

32 Claims, 9 Drawing Sheets

PROGRAM AGENT INITIATED PROCESSING OF ENQUEUED EVENT ACTIONS

FIELD OF THE INVENTION

The present invention is related to computer workload management. It is more particularly related to servicing workload events using program agents.

BACKGROUND OF THE INVENTION

Event processing is a difficult problem in distributed computing. Formally, an event is a notification of an occurrence in one part of a system to another part of the system. Events may be generated by several parts of a system and handled by several other components. Event processing is performed by the subsystem that decides which systems need to be notified of the event and in some cases, how they should act on the notification.

U.S. Pat. No. 5,469,562 "Durable atomic storage update manager" issued Nov. 21, 1995 provides a mechanism for fault-tolerant updating of a data store. The patent describes invoking independent program "agents" to perform work. The patent is incorporated herein by reference.

According the patent, a DASUM (Durable Atomic Storage Update Manager) provides an extensible framework assuring complex changes to persistent storage of data within a computer system, including a distributed computer system. During normal runtime, modifications to permanent storage are broken down and organized as a plurality of simpler transactions. These simpler transactions are accomplished atomically by executing associated agents within the computer program under execution. Each agent need only have the ability to complete its own process, and need not be able to deal with side effects from other transactions. Without needing to know what steps may be required, each agent supplies three agent-specific procedures that can be called during recovery from a fault. The DASUM provides seven services that, during normal transaction execution, can store information in a logger necessary for recovery from a fault. The recovery information stored in the logger can be used to replicate a dynamic tree-like fault tolerant update set that is maintained by the DASUM on an atomic basis. According to a second aspect of the invention, the DASUM provides recovery from the effects of incompletely executed transactions in the event of a fault. During fault recovery, the DASUM calls the agent specific procedures, as needed, using the recovery and recovery sequence information stored during normal transaction execution. The present invention advantageously permits separating the agents from the logger, simplifies logger design, and improves durability of the data to be persistently stored.

U.S. Pat. No. 6,192,354 "Apparatus and method for optimizing the performance of computer tasks using multiple intelligent agents having varied degrees of domain knowledge" issued Feb. 2, 2001 and incorporated herein by reference provides a system for implicitly dispatching tasks to program agents based on selecting the best agent using predetermined criteria. The patent teaches that performance of a given computer task is optimized by utilizing a plurality of intelligent agents suited to perform the computer task but having varied degrees of domain knowledge. Based upon an objective criteria that may be determined for a given situation, one of the plurality of intelligent agents may be selected and dispatched to perform the task, thereby optimizing the performance of the computer task for a wide variety of situations.

An improved method for processing events is needed.

SUMMARY OF THE INVENTION

A system is provided comprising program agents for requesting queued work based on tasks the agent knows it is able to complete. The tasks are load balanced among a variety of agents having different capabilities by instantiating more agents capable of performing prevalent queued tasks.

An event processing system preferably employs an event parser, an action queue, and a pool of program agents that can processes one or more action types. When an event is received by the system, the event parser decides which actions must be carried out as a result of the event. These actions are placed in the action queue. Agents in the pool make requests to the action queue for actions they are able to process.

Load balancing is achieved in this system by instantiating more program agents that are able to process action types that are enqueued in the event queue. Agents whose services are not required may be taken offline to release resources needed to instantiate necessary agents. Alternatively, agents capable of performing load balancing or scheduling can request more than one work item at a time to schedule those work items most efficiently.

Preferably events are embodied as pages in the Semantic Web with metadata. This metadata is preferably used by the event parser to determine which actions must be placed in the queue for a given event.

Data items produced by the agents are preferably embodied as pages in the Semantic Web with metadata. This metadata is preferably used to link an event, the resulting actions, the agents that processed them, and the resulting data items themselves.

It is therefore an object of the present invention to provide system, method and program product for handling program events. This is accomplished by enqueuing a plurality of program event actions in an event queue, the program event actions requiring actions to be performed, the program event actions comprising a first action type requiring a first action to be performed and a second action type requiring a second action to be performed. Then, instantiating a plurality of program agents for performing actions, the program agents comprising a first agent for performing one or more actions, the actions comprising the first action to be performed and a second agent for performing one or more actions, the actions comprising the second action to be performed. When the first agent is available performing a first action to be performed, the first agent initiating a first interrogation of the event queue, the interrogation querying the queue for outstanding program event actions comprising the first action type. When the first interrogation of the event queue determines that a program event action comprising the first action type is queued in the event queue, the first agent performing the first action to be performed and indicating in the event queue that the program event action having the first action type is assigned to the first agent.

It is another object of the invention to determine when the second agent is available to perform a second action to be performed, the second agent initiating a second interrogation of the event queue, the interrogation querying the queue for outstanding program event actions comprising the second action type. Then when the second interrogation of the event queue determines that a program event action comprising the second action type is queued in the event queue, the second agent performing the second action to be performed and indicating in the event queue that the program event action having the second action type is assigned to the second agent.

It is yet another object of the invention to determine the frequency of occurrence of program event actions of the first action type in the event queue. Then when the frequency of occurrence exceeds a high predetermined frequency, instantiating a first predetermined number of program agents of the first type based on the frequency determined.

In another object of the invention the determining step counts the number of actions of the first action type in the queue.

It is another object of the invention for the determining step to count the number of actions of the first action type in the queue during a predetermined period of time.

It is another object of the invention for the determining step to count the number of actions of the first action type in the queue. Then to determine a relative count comprising a relationship between the number of actions of the first action type in the queue with a number of total actions in the queue.

It is another object of the invention to determine the frequency of occurrence of program event actions of the first action type in the event queue. Then when a frequency of occurrence is less than a predetermined low frequency, retiring a predetermined number of program agents of the first type based on the frequency determined.

It is another object of the invention to parse a program event to determine one or more program event actions to be enqueued in the event queue. Preferably, events are embodied as Semantic Web pages as metadata wherein the parsing step comprises determining which program event actions are to be enqueued in the event queue based on metadata of a Semantic Web page of an event.

It is another object of the invention to provide agents wherein any one of the first or second agents produce data items, wherein a data item comprises Semantic Web pages having metadata, the metadata for any one of linking an event, linking the action to be performed, linking the agent or linking the data items.

It is another object of the invention to determine the frequency of occurrence of program event actions of the first action type in the event queue. Then when the frequency of occurrence exceeds a high predetermined frequency, comprising conditions for instantiating a first predetermined number of program agents of the first type based on the frequency determined. Then when the number of program agents that can be instantiated is less than the first predetermined number of program agents, refusing any one of events, events that lead to actions of the first type or enqueing program event actions of events.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE PREFERRED EMBODIMENTS

Figure 1:
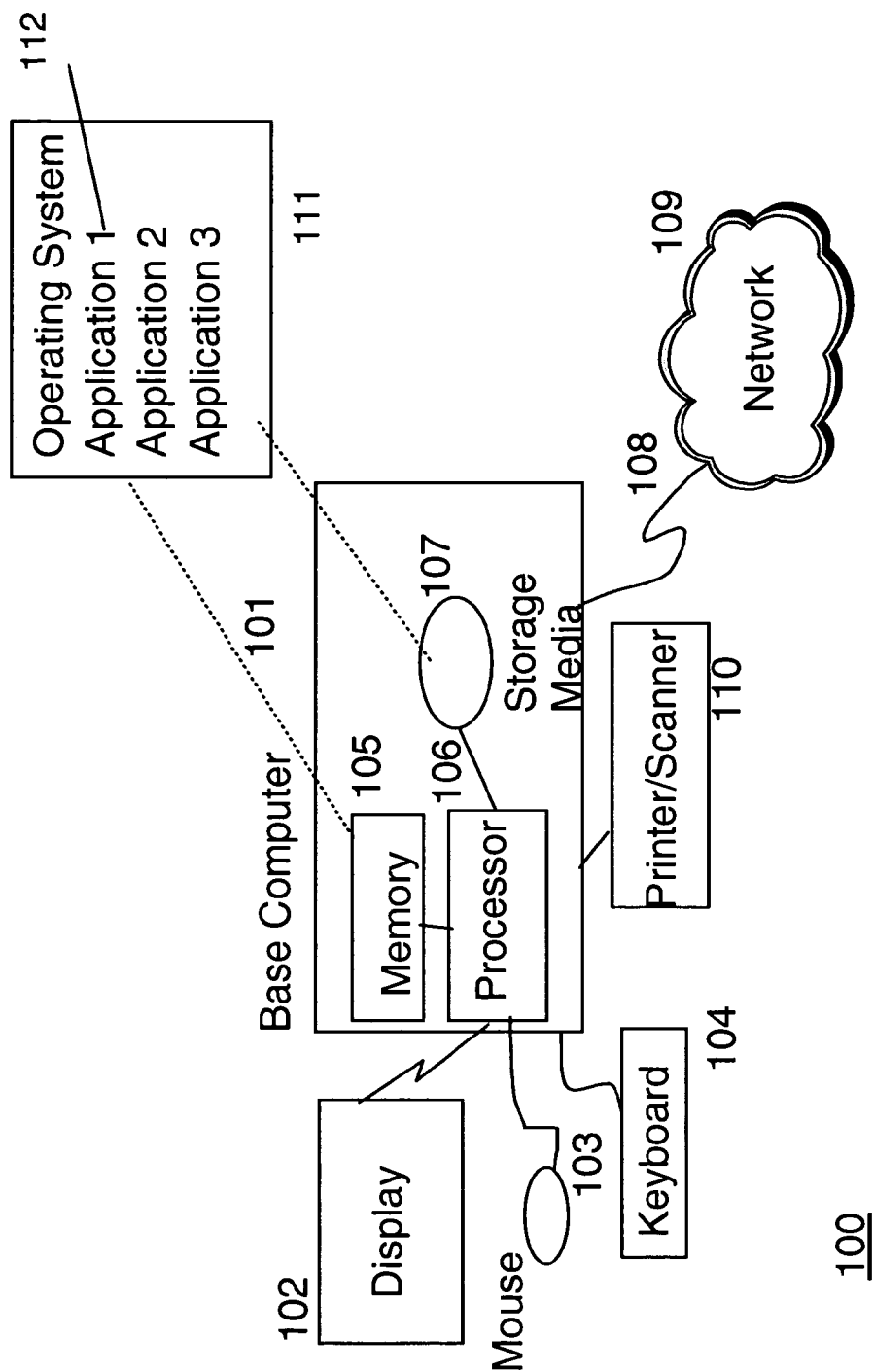
FIG. 1 is a diagram depicting components of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
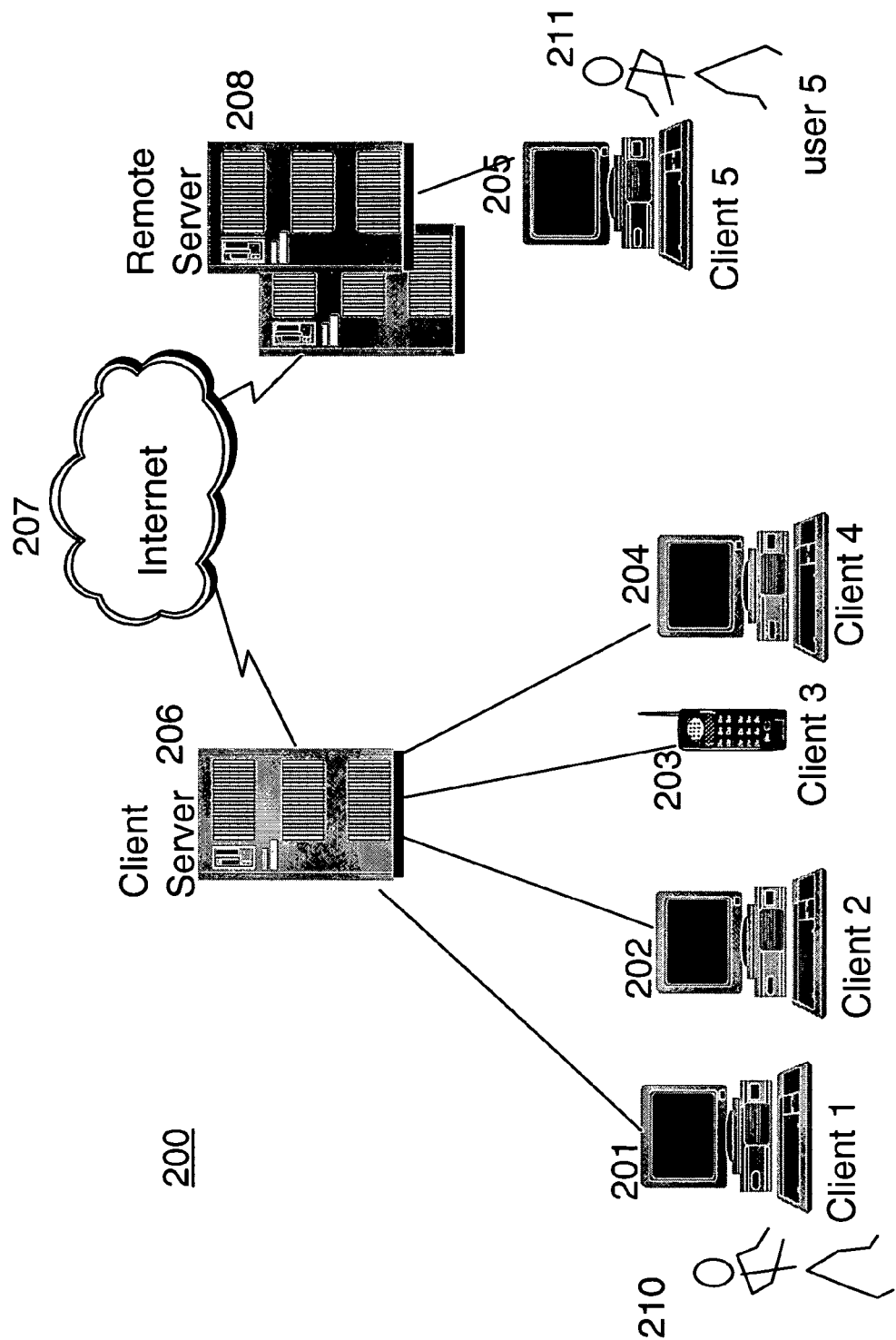
FIG. 2 is a diagram depicting a network of computer systems.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zServer 900 Server available from IBM.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

Event processing is a difficult problem in distributed computing. Formally, an event is a notification of an occurrence in one part of a system to another part of the system. Events are preferably generated by several parts of a system and handled by several other components. Event processing is the subsystem that decides which systems need to be notified and in some cases, how they should act on the notification.

This invention provides a solution to event processing via a queue to store actions that must be completed as a result of an event. Furthermore, Semantic Web technologies are preferably used to decide how events should be processed and also to link the data generated by an event to the source of the event.

Figure 3A:
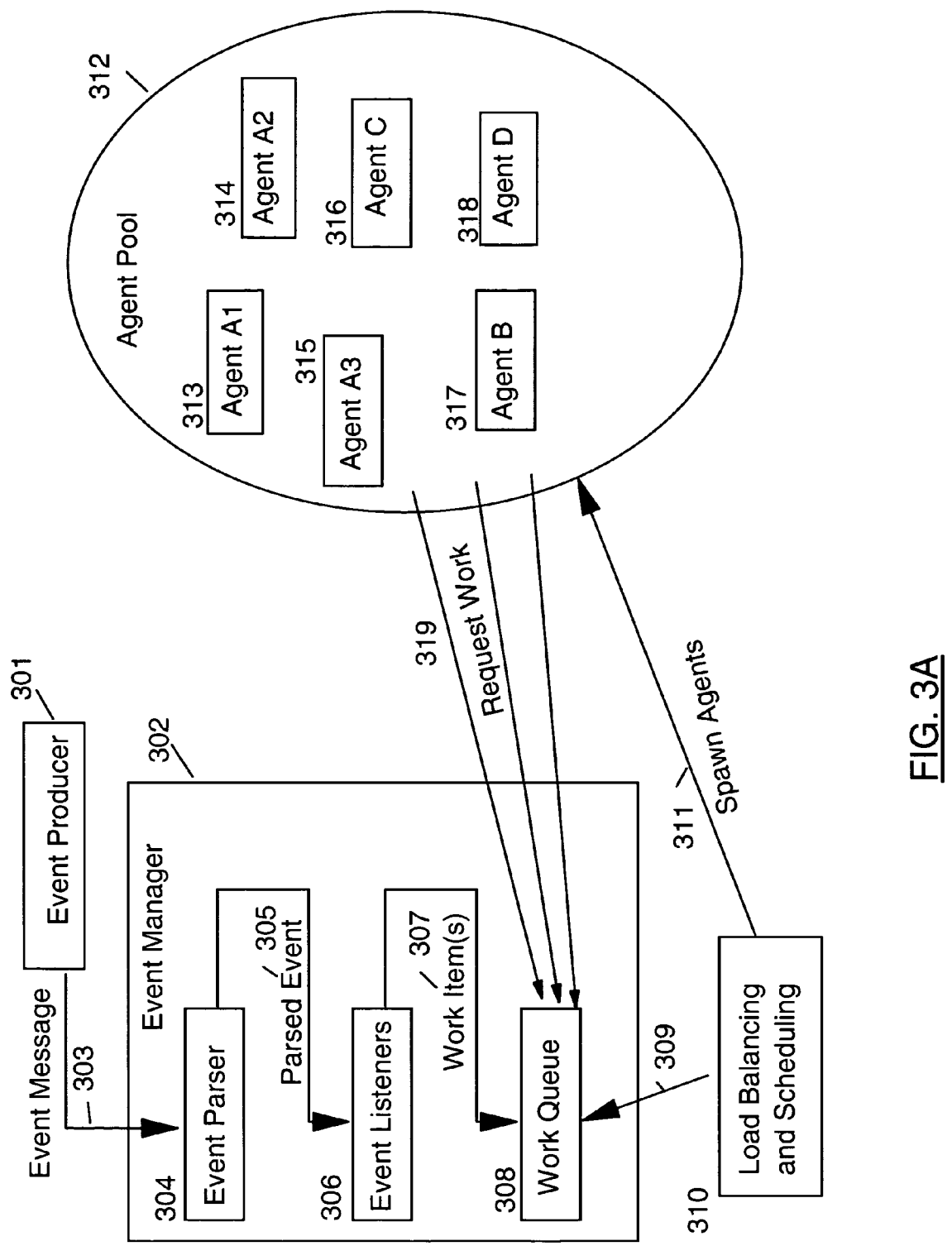
FIG. 3A depicts components of an example system of the present invention.
Figure 3B:
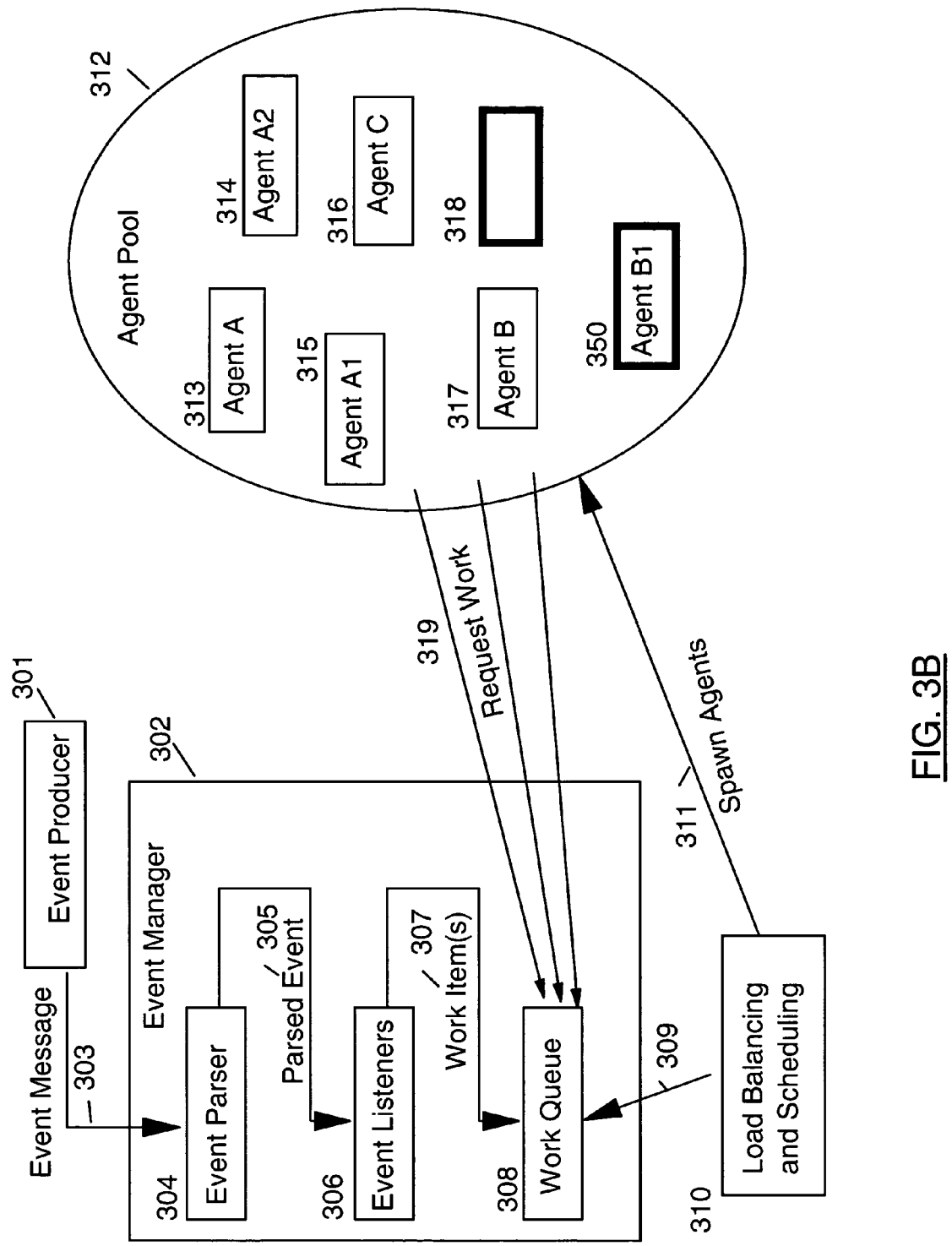
FIG. 3B depicts components of an example system of the resent invention.

Referring to FIGS. 3A and 3B depicting components of a system for an event-based agent system running on a queue model wherein events are queued up in a central queue until the event can be processed. The system is composed of two components: the Event Manager 302 and the Program Agents 313 314 315 316 317 318 that execute the events. The system provides an extensible framework for performing load balancing and scheduling. Preferably, events are embodied as pages in the Semantic Web that contain metadata to aid in event processing.

Figure 4:
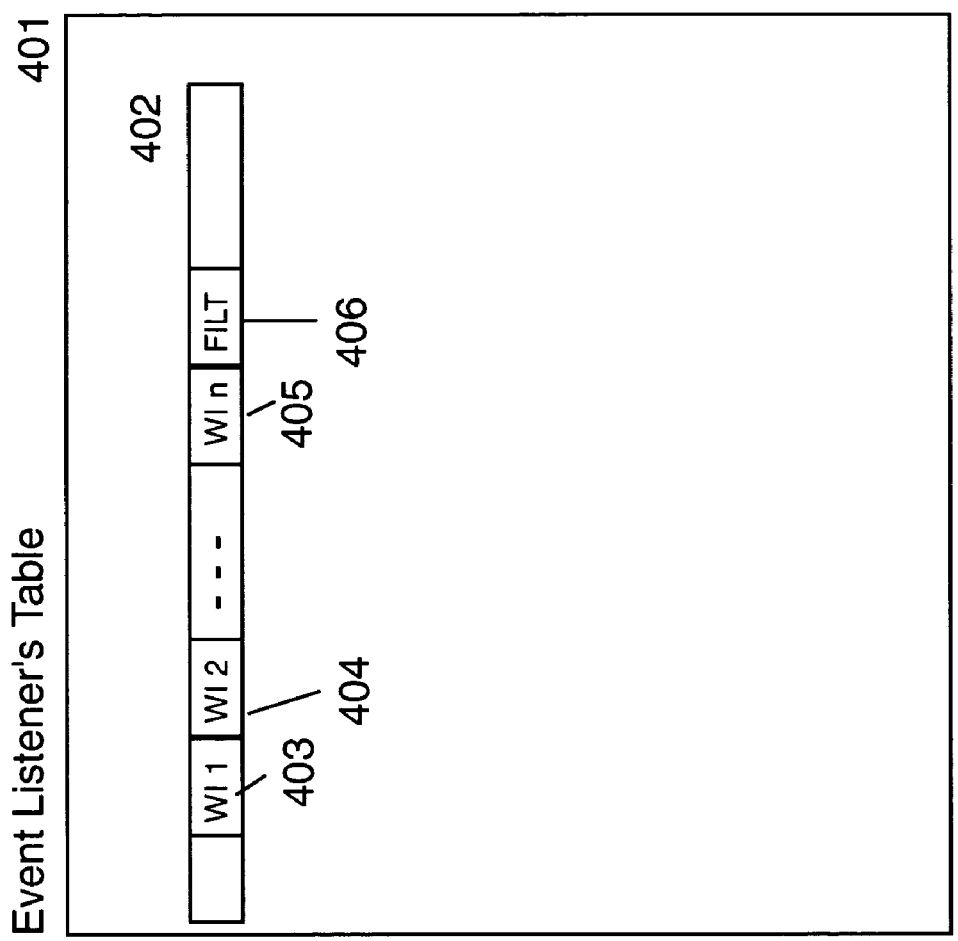
FIG. 4 depicts example fields of an entry in an Event Listeners Table.

The Event Manager 302 operates as follows. When an Event Message 303 is received from an Event Producer 301 by the Event Manager 302, the Event Parser 304 extracts the event-type and the event metadata and passes it 305 to the event listener 306. The Event Parser 304 consumes and understands the message 303 containing the event. The actual behavior of the event parser 304 will be determined by the message format of the event. The event-type is the first-order classification of the event used to determine how to process the event. The metadata is a set of more general and loosely structured properties that can be used to dispatch the event or be passed on to the agent. The Event Manager 302 compares the parsed event 305 with the items in the Event Listeners table (reference FIG. 4). The Event Listeners table 401 is a list of mappings from event-type to work-item. This table might also specify a second-level of indirection based on the event metadata. Based on the result of querying the Event Listeners table 306, the Event Manager generates the necessary work items 307 and places them 307 in the Work Queue 308. A given event may generate several necessary work items 307. Each work item is classified as a single work-type and requires an action to be performed by an agent 312. Extra parameters to the work-item are specified in the event metadata.

An agent 313, capable of performing one or more work-types, makes a request to the Event Manager 302 for work. If a work item of the appropriate work-type is available in the Work Queue 308, this work item will be assigned to that agent 313. The agent's 313 ID will be marked in the Work Queue 308. When the agent 313 reports back with either success or failure, the work item will be marked as complete and any metadata the agent created about the event will be committed by the Event Manager 302 to a central metadata store.

Referring to FIG. 3B, Load Balancing and Scheduling 310 may be achieved by instantiating more agents 350 capable of performing work items most prevalent in the queue. Alternatively, agents 312 capable of performing scheduling themselves for certain work-types can request multiple work types and execute them more efficiently.

The Load Balancing and Scheduling component 310 is shown as being somewhat separate from the Event Manager 302 because different implementations may choose to couple this component tightly or loosely with the Event Manager 302. Load balancing is the practice of distributing work among machines such that each machine is utilized most efficiently. To achieve load balancing in the context of this system, the Load Balancer will instantiate agents 312 such that each machine will be most efficiently utilized. Scheduling is the practice of deciding which work a machine is to complete first based on criteria such as work priority and work size. In the context of the present system, scheduling is achieved by deciding which type of agents to instantiate first (and how many agents to instantiate). This will in turn decide which work items are carried out first.

If the Load Balancer requests additional Agents 312 and is refused, it can advise the Event Manager 302 to refuse processing of events that lead to actions for which there are no available agents.

The Event Manager is preferably implemented with a relational database using the following tables. The Event Listeners table 401 maintains a many-to-many mapping of events to work-types. That is, each row 402 in the table will contain a list of work items 403 404 405 that must be completed. Several rows 402 in the Event Listeners table 401 preferably apply to a given event (which is why the mapping is many-to-many). In addition, each row preferably contains a filter 406 to be applied to the metadata of the event to either constrain the metadata that the agent is actually given or to make a decision about whether to process the event. This filter 406 preferably takes the form of an RDF query in the case that event metadata is embodied in RDF.

Figure 5:
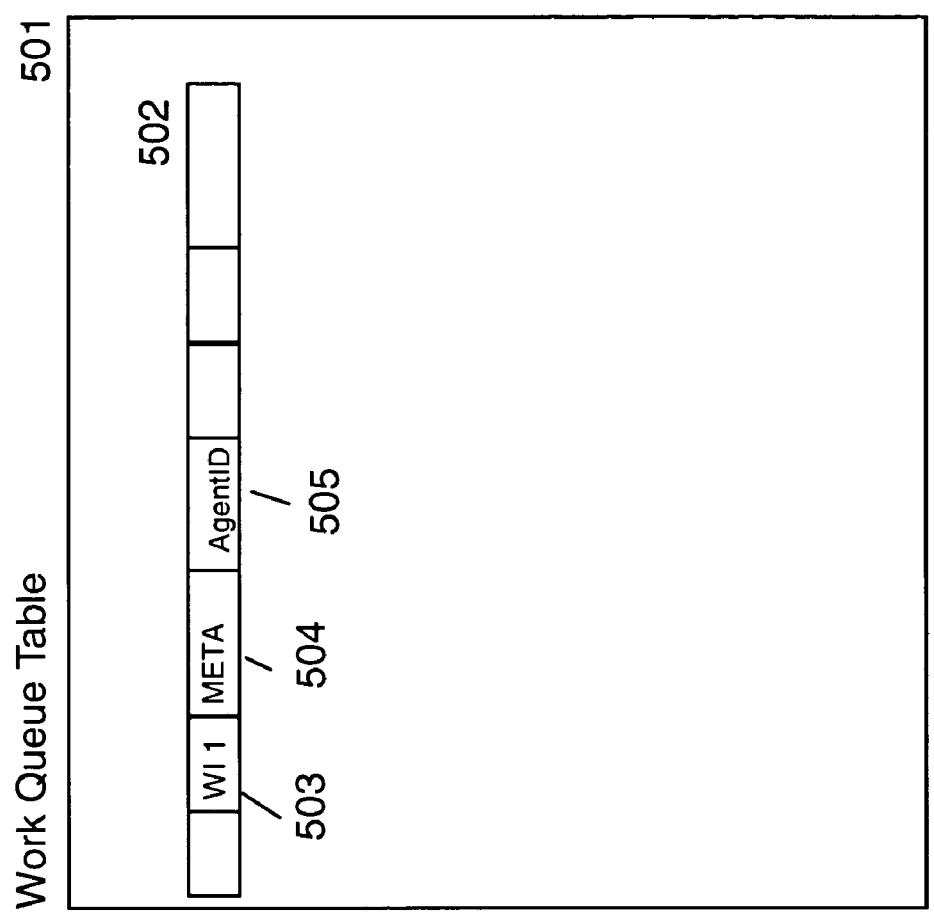
FIG. 5 depicts example fields of a Work Queue Table.
Figure 6:
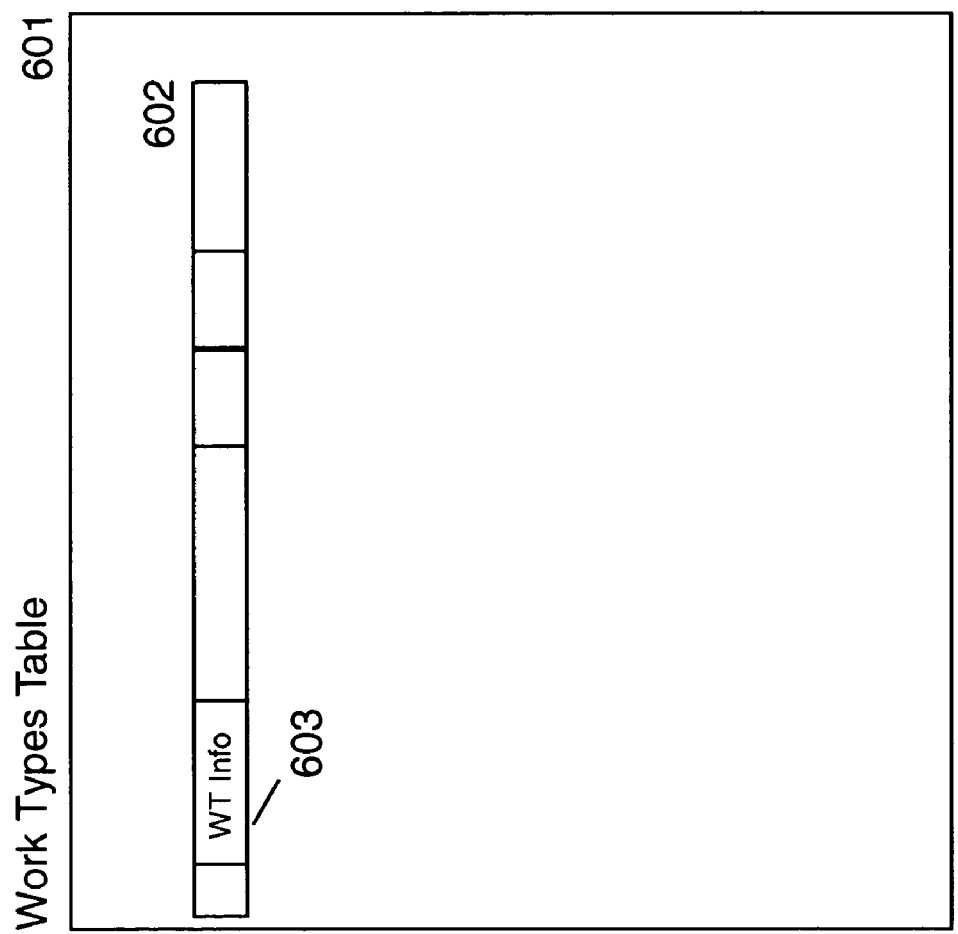
FIG. 6 depicts example fields of a Work Types Table.

Referring to FIG. 5, the Work Queue table 501 stores work items that need to be completed by agents 312, event metadata that the agent will use to complete the work task initiated by the event, and the agent (if any) 505 assigned to the work item. Referring to FIG. 6, the Work Types table 602 stores information 603 about specific work types. This information is preferably used by the load balancing component to schedule jobs or spawn agents to handle certain work-types.

Communication between event producers 301 and the event manager 302 as well as agents 312 and the event manager 302 is implementation dependent. The event producers 301, the event manager 302 and the agents 312 in one embodiment all run on the same machine in which case communication preferably takes place via in-memory calls. Preferably, RPC techniques such as Web Services, CORBA, or Java RMI are employed in a distributed environment.

Web Services are discussed in U.S. patent application Ser. No. 10/406,378 "PROGRAM CREATION BY COMBINING WEB SERVICES USING GRAPHIC USER INTERFACE CONTROLS" filed on Apr. 2, 2003 and incorporated herein by reference.

Preferably a central RDF metadata store is employed if the metadata generated by agents 312 must be persistently stored. In an example embodiment, HEWLETT-PACKARD DEVELOPMENT COMPANY's JENA framework is used as such a store. JENA is available for download on the World Wide Web at "www.hp1.hp.com/semweb/jena.htm".

Jena is a Java framework for writing Semantic Web applications. As from version 2.0 it has its own web site with all of the details and documentation on line:

Jena Overview:

Jena is a Java framework for writing Semantic Web applications. It features:
An RDF API
statement centric methods for manipulating an RDF model as a set of RDF triples
resource centric methods for manipulating an RDF model as a set of resources with properties
cascading method calls for more convenient programming
built in support for RDF containers—bag, alt and seq
enhanced resources—the application can extend the behavior of resources
integrated parsers and writers for RDF/XML (ARP), N3 and N-TRIPLES
support for typed literals
ARP—Jena's RDF/XML Parser—ARP aims to be fully compliant with the latest decisions of the RDF Core Work Group. The Jena 2.0 version is compliant with the Editor's Working Drafts at time of release. ARP is typically invoked using Jena's read operations, but can also be used standalone.

Persistence:

The Jena2 persistence subsystem implements an extension to the Jena Model class that provides persistence for models through use of a back-end database engine. Jena2 is largely backwards-compatible for Jena1 applications with the exception of some database configuration options. The default Jena2 database layout uses a denormalized schema in which literals and resource URIs are stored directly in statement tables. This differs from Jena1 in which all literals and resources were stored in common tables that were referenced by statements. Thus, the Jena2 layout enables faster insertion and retrieval but uses more storage than Jena1. Configuration options are available that give Jena2 users some control over the degree of denormalization in order to reduce storage consumption.

The persistence subsystem supports a Fastpath capability for RDQL queries that dynamically generates SQL queries to perform as much of the RDQL query as possible within an SQL database engine. Currently, Jena2 can use three SQL database engines, MySQL, Oracle and PostgreSQL. These are supported on Linux and WindowsXP. As with Jena1, the persistence subsystem is designed to be portable to other SQL database engines.

Reasoning Subsystem:

The Jena2 reasoner subsystem includes a generic rule based inference engine together with configured rule sets for RDFS and for the OWL/Lite subset of OWL Full. These reasoners can be used to construct inference models which show the RDF statements entailed by the data being reasoned over. The subsystem is designed to be extensible so that it should be possible to plug a range of external reasoners into Jena, though worked examples of doing so are left to a future release. Of these components, the underlying rule engine and the RDFS configuration should be reasonably stable. The OWL configuration is preliminary and still under development.

Ontology Subsystem:

The Jena2 ontology API is intended to support programmers who are working with ontology data based on RDF. Specifically, this means support for OWL, DAML+OIL and RDFS. A set of Java abstractions extend the generic RDF Resource and Property classes to model more directly the class and property expressions found in ontologies using the above languages, and the relationships between these classes and properties. The ontology API works closely with the reasoning subsystem derive additional information that can be inferred from a particular ontology source. Given that ontologists typically modularise ontologies into individual, re-usable components, and publish these on the web, the Jena2 ontology subsystem also includes a document manager that assists with process of managing imported ontology documents.

RDQL query language:

RDQL is a query language for RDF data. The implementation in Jena is coupled to relational database storage so that optimized query is performed over data held in a Jena relational persistent store.

In an example embodiment, event x is notification that a text document has been submitted by 301 for processing. The first-order classification of the event is "New Text Document". The event metadata, embodied in RDF, indicates that this document is in English". After the Event Parser 304 extracts this information 305 from the Event Message 303, the Event Listener 306 is consulted for what work should be done. Because the event is of type "New Text Document", the document must be formatted so a work item of type "Text Format" must be completed. Furthermore, because the document is English, it must be translated into French so a second work item for translation is added. These two Work Items are now queued on the Work Queue 308.

The Scheduler 310 inspects 309 the Work Queue 308 to determine if any new Agents 350 must be instantiated. The Scheduler 310 uses the following algorithm to determine which Agents 350 need to be instantiated. Suppose during time T, A action items of type P are added to the queue, and R action items of type P are requested by agents, if A-R>delta, instantiate round((A-R)/(agents(R)/R)) agents who can process actions of type P. Intuitively, if the number of Actions items exceeds the number of Agent requests for those items over a certain time period, more agents should be instantiated. Delta signifies backlog tolerance of the queue. Agents(R) is the number of different agents participating in the R requests therefore agents(R)/R is the number of agents it takes to make a single request. For example if A=100 and R=50 and agents (R)=1, 1 additional agent should be requested. Agents(R) can be computed by looking at the previous R requests in the queue and seeing which agents were assigned to the Actions.

The process of instantiating Agents 350 can be embodied as a service running on a computer or group of computers that can take requests for Agents 350 to be instantiated. This service starts a thread or a process that runs the Agent code on a single machine. The Agent code will contain both the general purpose code needed to request work as well as code specific to performing the action types. The Agent code exists on each machine or is made easily available to each machine over a network.

The Load Balancer 310 decides the machine on which to instantiate an Agent. The Load Balancer can use a simple round robin algorithm where it asks each computer in turn to instantiate an Agent.

Agent A1 315 requests formatting work and is assigned to the task. This is recorded in the Work Queue 308. Agent B 317 requests translation work and is assigned to the task. This is also recorded in the Work Queue 308.

Agent A1 315 reports back that it has finished formatting the text document and informs the Event Manager 302 of the location of the formatted file. Optionally, the Event Manager 302 adds metadata to the store that links the original file to the formatted file. Agent B 317 reports back that is has finished translating the text document into French and informs the Event Manager 302 of the location of the translated file. Optionally, the Event Manager adds metadata to the store that links the original file to the translated file.

Suppose that after performing translation, Agent B makes several subsequent requests for translation work but never finds work in the queue. Agent B, may at some point, decide to retire itself 318. That is, end its process or thread, freeing up resources on its host machine. Agent B's retirement decision can be made using the following algorithm. Suppose that Agent B makes R requests for various Actions that it can perform and that A actions are assigned to it over those R requests. Agent B decides to retire if R-A>epsilon. Intuitively, Agent A will retire if it feels that its services are no longer required.

A typical embodiment of this system will utilize Web Services for communication between Event Producers 301 and the Event Manager 302 and between the Event Manager 302 and the Agents 313. Some embodiments will implement the Load Balancing component 310 as a separate entity and communication between 310 and the Agents and Event Manager would have to be considered. In this typical embodiment, the Load Balancing component 310 exists on the same machine as all of the Event Manager 302 components.

The Event Message 303 is embodied as a SOAP Web Service request containing the Event Type and the Event metadata. In the SOAP Request, the Event Type is embodied as a SOAP parameter and the metadata is embodied as a MIME Attachment. The SOAP Response will be empty if the event was received successfully; a SOAP Fault will be returned otherwise. Web Services are discussed in U.S. patent application Ser. No. 10/406,378 "PROGRAM CREATION BY COMBINING WEB SERVICES USING GRAPHIC USER INTERFACE CONTROLS" filed on Apr. 2, 2003, assigned to IBM and incorporated herein by reference.

The Work Request 319 is embodied as a SOAP Web Service request containing the Action Type(s) the Agent 313 is capable of performing. This list of Action Types is embodied as an XML serialization of an array of strings. If the Event Manager finds work for the Agent, the response is a SOAP response containing the Action Type and the Event metadata. In the SOAP Response, the Action Type is embodied as a SOAP parameter and the metadata is embodied as a MIME Attachment. If the Event Manager finds no work for the Agent, an empty SOAP response is returned.

The Spawn Agent Request 311 from the Load balancer is embodied as a SOAP Web Service request containing the Action Type(s) that are in demand in the queue. If the machines of 312 are unable to instantiate further agents, a SOAP Fault will be returned. If the machines 312 are able to instantiate further agents, an empty SOAP response will be returned indicating success.

Figure 7:
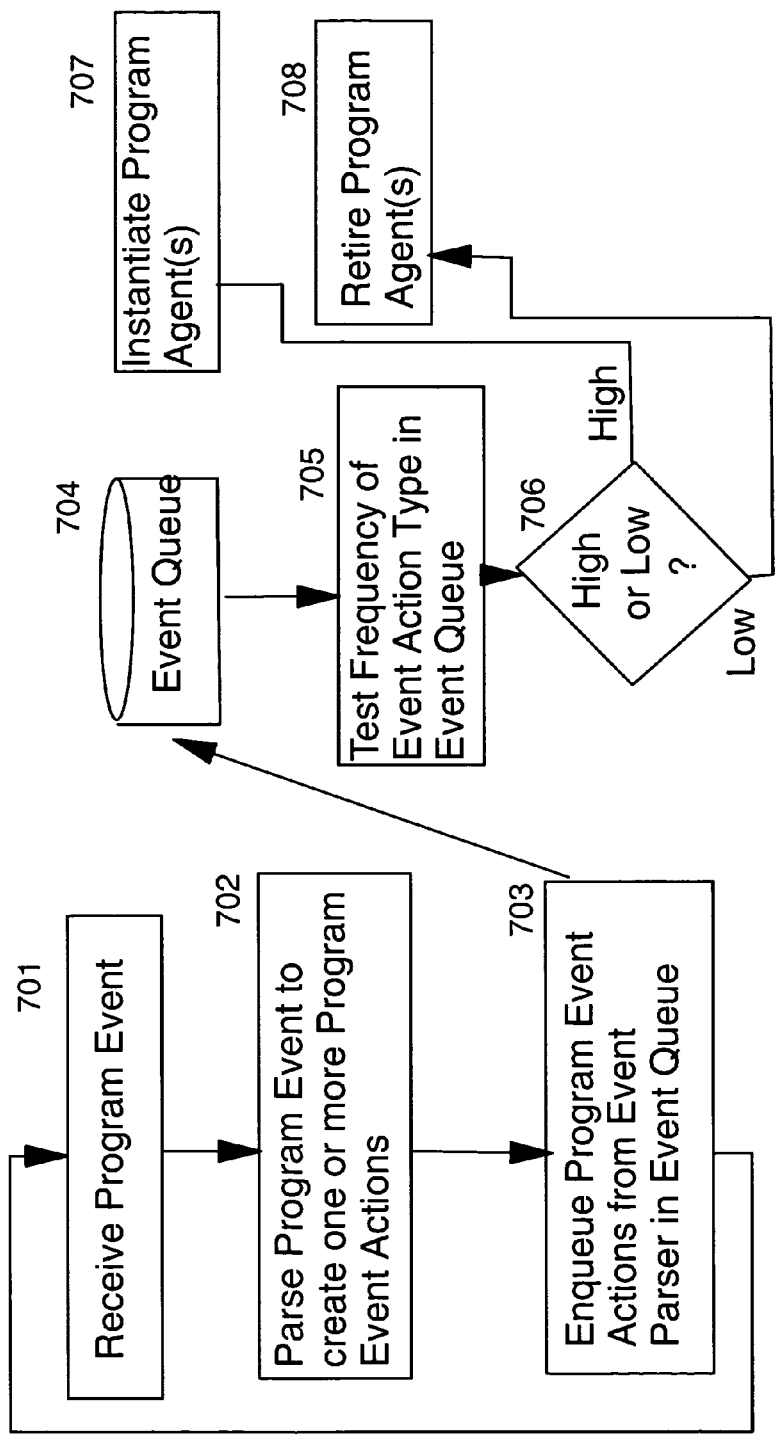
FIG. 7 depicts an example embodiment of the invention.

Referring to FIG. 7, in an example embodiment, the Event Manager 302 receives a Program Event 701. The Event is Parsed 702 to create one or more Program Event Actions (work items). The Event Actions are enqueued 703 in the Event Queue 704. The frequency of Event Action Types queued in the Event Queue is monitored 705 against predetermined criteria. Agents are instantiated 707 if 706 more agents for handling the Action Type are required or retired 708 when 706 less Agents for handling the Action Type are required based on the predetermined criteria.

Figure 8:
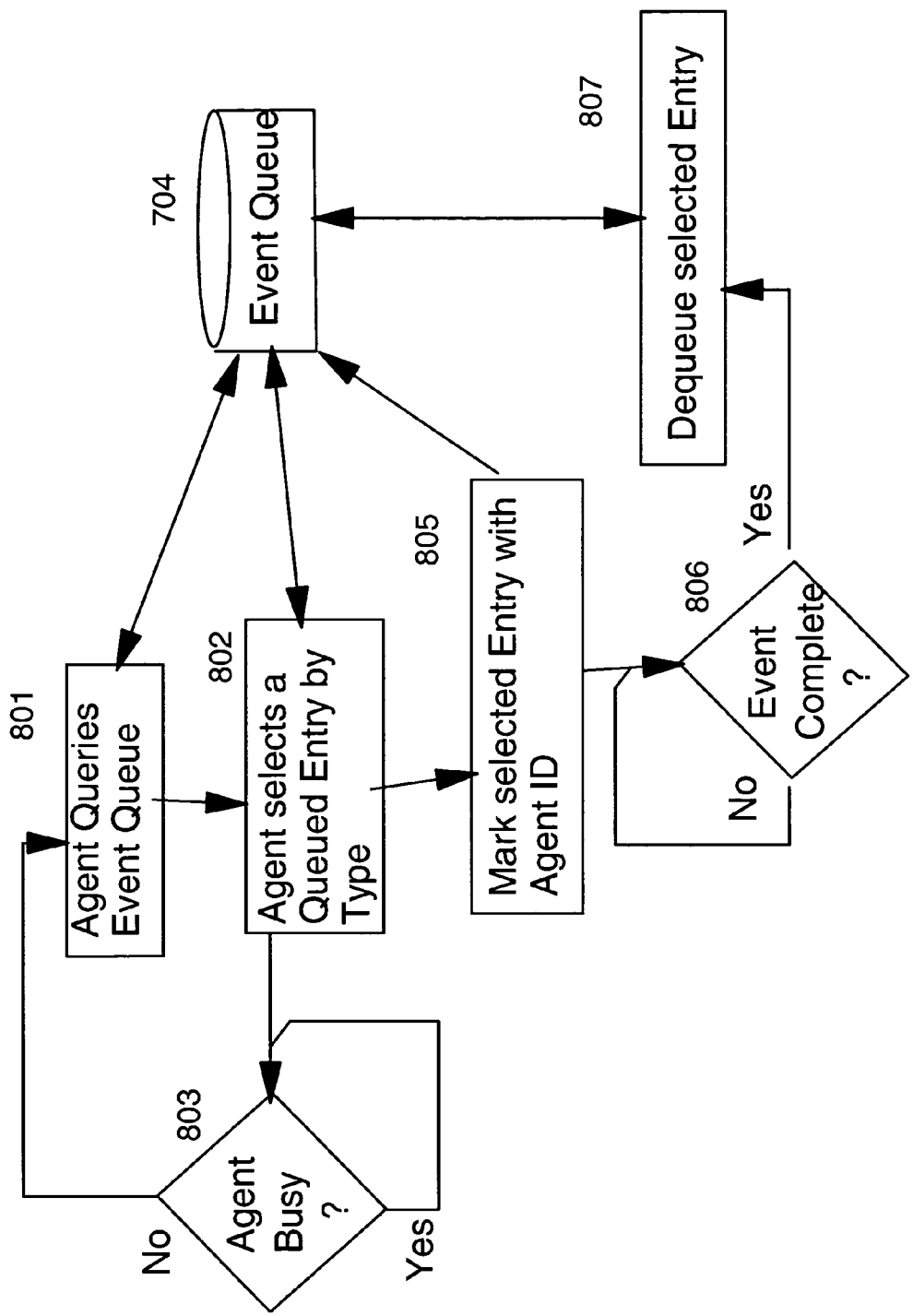
FIG. 8 depicts an example embodiment of the invention.

Active Agents having the capability for handling one or more action types in a pooi of agents 312 (referring to FIG. 8), when not busy 803, query 801 the Event Queue 704 for queued Event Actions of the action type(s) that an agent 313 can handle. The agent 313 finding a queued event that needs an action of the type, selects the entry 802 for processing. The Entry in the Event Queue 704 is marked 805 preferably with the ID of the agent 313. When the Event that Spawned the action is complete 806, the action is dequeued 807 from the Event Queue 804.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed:

1. A method in a computer program environment for handling programs events, the method comprising:
   enqueuing a plurality of program event actions in an event queue, the program event actions requiring actions to be performed, the program event actions comprising a first action type requiring a first action to be performed and a second action type requiring a second action be performed; and
   determining a frequency of occurrence of program event actions of the first action type in the event queue;
   instantiating a plurality of program agents for performing actions, the program agents comprising a first agent for performing one or more first agent actions, the first agent actions comprising the first action to be performed and a second agent for performing one or more second agent actions, the second agent actions comprising the second action to be performed, wherein responsive to the frequency of occurrence exceeds a high predetermined frequency, instantiating a first predetermined number of program agents of the first type based on the frequency determined, wherein the first action to an action of a first action type, wherein the second action is an action of a second action type;
   responsive to the first agent being available to perform the first action to be performed, the first agent initiating a first interrogation of the event queue, the first interrogation querying the event queue for outstanding program event actions comprising the first action type, wherein the first interrogation comprises a request for work;
   responsive to the first interrogation of the event queue determining that a program event action comprising the first action type is queued in the event queue, the first agent performing the first action to be performed; and
   responsive to the first action being assigned to the first agent, indicating in the event queue that the program event action having the first action type is assigned to the first agent.

2. The method according to claim 1, further comprising:
   responsive to the second agent being available to perform a second action to be performed, the second agent initiating a second interrogation of the event queue, the interrogation querying the event queue for outstanding program event actions comprising the second action type wherein the second interrogation comprises a request for work;
   responsive to the second interrogation of the event queue determining that a program event action comprising the second action type is queued in the event queue, the second agent performing the second action to be performed; and
   responsive to the second action being assigned to the second agent, indicating in the event queue that the program event action having the second action type is assigned to the second agent.

3. The method according to claim 1, wherein the determining step further comprises:
   counting the number of actions of the first action type in the event queue.

4. The method according to claim 1, wherein the determining step further comprises:
   counting the number of actions of the first action type in the event queue during a predefined period of time.

5. The method according to claim 1, wherein the determining step further comprises:
   counting the number of actions of the first action type in the event queue; and
   determining a relative count comprising a relationship between the number of actions of the first action type in the queue and a number of total actions in the queue.

6. The method according to claim 1, further comprising:
   determining the frequency of occurrence of program event actions of the first action type in the event queue; and
   responsive to a frequency of occurrence being less than a predetermined low frequency, retiring a predetermined number of program agents capable of performing the first action type based on the frequency determined.

7. The method according to claim 1, further comprising:
   the first agent determining a frequency of occurrence of program event actions of the first action type in the event queue; and
   responsive to a frequency of occurrence being less than a predetermined low frequency, the first agent retiring itself based on the frequency determined.

8. The method according to claim 1 comprising the further step of parsing a program event to determine one or more program event actions to be enqueued in the event queue.

9. The method according to claim 8, wherein events are embodied as Semantic Web pages as metadata wherein the parsing comprises:
   determining which program event actions are to be enqueued in the event queue based on metadata of a Semantic Web page of an event.

10. The method according to claim 1, further comprising:
    any one of the first agent or the second agent producing data items, wherein a data item comprises Semantic Web pages having metadata, the metadata for any one of linking an event, linking the action to be performed, linking the agent or linking the data items.

11. The method according to claim 1, further comprising:
    determining a frequency of occurrence of program event actions of the first action type in the event queue; and
    responsive to the frequency of occurrence exceeding a high predetermined frequency, instantiating a first predetermined number of program agents capable of performing the first action type based on the frequency determined; and
    responsive to the number of program agents that can be instantiated being less than the first predetermined number of program agents, refusing any one of program events, program events that lead to actions of the first type or enqueing program event actions of events.

12. A system in a computer program environment for handling program events, the system comprising:
    a network;
    a first computer system in communication with the network wherein the computer system includes instructions to execute a method comprising:
    enqueuing a plurality of program event actions in an event queue, the program event actions requiring actions to be performed, the program event actions comprising a first action type requiring a first action to be performed and a second action type requiring a second action be performed; and
    determining a frequency of occurrence of program event actions of the first action type in the event queue;
    instantiating a plurality of program agents for performing actions, the program agents comprising a first agent for performing one or more first agent actions, the first agent actions comprising the first action to be performed and a second agent for performing one or more second agent actions, the second agent actions comprising the second action to be performed, wherein responsive to the frequency of occurrence exceeds a high predetermined frequency, instantiating a first predetermined number of program agents of the first type based on the frequency determined, wherein the first action to an action of a first action type, wherein the second action is an action of a second action type;

responsive to the first agent being available to perform the first action to be performed, the first agent initiating a first interrogation of the event queue, the first interrogation querying the event queue for outstanding program event actions comprising the first action type, wherein the first interrogation comprises a request for work;

responsive to the first interrogation of the event queue determining that a program event action comprising the first action type is queued in the event queue, the first agent performing the first action to be performed; and responsive to the first action being assigned to the first agent, indicating in the event queue that the program event action having the first action type is assigned to the first agent.

13. The system according to claim 12, further comprising:

responsive to the second agent being available to perform a second action to be performed, the second agent initiating a second interrogation of the event queue, the interrogation querying the event queue for outstanding program event actions comprising the second action type, wherein the second interrogation comprises a request for work;

responsive to the second interrogation of the event queue determining that a program event action comprising the second action type is queued in the event queue, the second agent performing the second action to be performed; and responsive to the second action being assigned to the second agent, indicating in the event queue that the program event action having the second action type is assigned to the second agent.

14. The system according to claim 13, wherein the determining step further comprises:

counting the number of actions of the first action type in the event queue.

15. The system according to claim 13, wherein the determining step further comprises:

counting the number of actions of the first action type in the event queue during a predefined period of time.

16. The system according to claim 12, wherein the determining step further comprises:

counting the number of actions of the first action type in the event queue; and determining a relative count comprising a relationship between the number of actions of the first action type in the queue and a number of total actions in the queue.

17. The system according to claim 12, further comprising:

determining the frequency of occurrence of program event actions of the first action type in the event queue; and responsive to a frequency of occurrence being less than a predetermined low frequency, retiring a predetermined number of program agents capable of performing the first action type based on the frequency determined.

18. The system according to claim 12, further comprising parsing a program event to determine one or more program event actions to be enqueued in the event queue.

19. The system according to claim 18 wherein events are embodied as Semantic Web pages as metadata wherein the parsing step comprising the further step of:

determining which program event actions are to be enqueued in the event queue based on metadata of a Semantic Web page of an event.

20. The system according to claim 12, further comprising:

any one of the first agent or the second agent producing data items, wherein a data item comprises Semantic Web pages having metadata, the metadata for any one of linking an event, linking the action to be performed, linking the agent or linking the data items.

21. The system according to claim 12, further comprising:

determining a frequency of occurrence of program event actions of the first action type in the event queue; and responsive to the frequency of occurrence exceeding a high predetermined frequency, instantiating a first predetermined number of program agents capable of performing the first action type based on the frequency determined; and responsive to the number of program agents that can be instantiated being less than the first predetermined number of program agents, refusing any one of program events, program events that lead to actions of the first type or enqueing program event actions of events.

22. A computer program product in a computer program environment for handling program events, the computer program product comprising:

a storage medium readable by a processing circuit and storing instructions for execution by a processing circuit for performing a method comprising:

enqueuing a plurality of program event actions in an event queue, the program event actions requiring actions to be performed, the program event actions comprising a first action type requiring a first action to be performed and a second action type requiring a second action be performed; and determining a frequency of occurrence of program event actions of the first action type in the event queue;

instantiating a plurality of program agents for performing actions, the program agents comprising a first agent for performing one or more first agent actions, the first agent actions comprising the first action to be performed and a second agent for performing one or more second agent actions, the second agent actions comprising the second action to be performed, wherein responsive to the frequency of occurrence exceeds a high predetermined frequency, instantiating a first predetermined number of program agents of the first type based on the frequency determined, wherein the first action to an action of a first action type, wherein the second action is an action of a second action type;

responsive to the first agent being available to perform the first action to be performed, the first agent initiating a first interrogation of the event queue, the first interrogation querying the event queue for outstanding program event actions comprising the first action type, wherein the first interrogation comprises a request for work;

responsive to the first interrogation of the event queue determining that a program event action comprising the first action type is queued in the event queue, the first agent performing the first action to be performed; and responsive to the first action being assigned to the first agent, indicating in the event queue that the program event action having the first action type is assigned to the first agent.

23. The computer program product according to claim 22, further comprising:
- responsive to the second agent being available to perform a second action to be performed, the second agent initiating a second interrogation of the event queue, the interrogation querying the event queue for outstanding program event actions comprising the second action type, wherein the second interrogation comprises a request for work;
- responsive to the second interrogation of the event queue determining that a program event action comprising the second action type is queued in the event queue, the second agent performing the second action to be performed; and
- responsive to the second action being assigned to the second agent, indicating in the event queue that the program event action having the second action type is assigned to the second agent.

24. The computer program product according to claim 22, wherein the determining step further comprises:
- counting the number of actions of the first action type in the event queue.

25. The computer program product according to claim 22, wherein the determining step further comprises:
- counting the number of actions of the first action type in the event queue during a predefined period of time.

26. The computer program product according to claim 22, wherein the determining step further comprises:
- counting the number of actions of the first action type in the event queue; and
- determining a relative count comprising a relationship between the number of actions of the first action type in the queue and a number of total actions in the queue.

27. The computer program product according to claim 22, further comprising:
- determining the frequency of occurrence of program event actions of the first action type in the event queue; and
- responsive to a frequency of occurrence being less than a predetermined low frequency, retiring a predetermined number of program agents capable of performing the first action type based on the frequency determined.

28. The computer program product according to claim 22, further comprising parsing a program event to determine one or more program event actions to be enqueued in the event queue.

29. The computer program product according to claim 28 wherein events are embodied as Semantic Web pages as metadata wherein the parsing step comprising the further step of:
- determining which program event actions are to be enqueued in the event queue based on metadata of a Semantic Web page of an event.

30. The computer program product according to claim 22, further comprising:
- any one of the first agent or the second agent producing data items, wherein a data item comprises Semantic Web pages having metadata, the metadata for any one of linking an event, linking the action to be performed, linking the agent or linking the data items.

31. The computer program product according to claim 22, further comprising:
- determining a frequency of occurrence of program event actions of the first action type in the event queue; and
- responsive to the frequency of occurrence exceeding a high predetermined frequency, instantiating a first predetermined number of program agents capable of performing the first action type based on the frequency determined; and
- responsive to the number of program agents that can be instantiated being less than the first predetermined number of program agents, refusing any one of program events, program events that lead to actions of the first type or enqueing program event actions of events.

32. The computer program product according to claim 22, further comprising:
- the first agent determining a frequency of occurrence of program event actions of the first action type in the event queue; and
- responsive to a frequency of occurrence being less than a predetermined low frequency, the first agent retiring itself based on the frequency determined.

* * * * *